(12) United States Patent
Altwegg

(10) Patent No.: US 8,825,198 B2
(45) Date of Patent: Sep. 2, 2014

(54) CONTROL DEVICE FOR A PROCESSING INSTALLATION FOR THE PRODUCTION OF COLLECTIONS OF PRINTED PRODUCTS

(75) Inventor: Heinz Altwegg, Fehraltorf (CH)

(73) Assignee: Ferag AG, Hinwil (CH)

( * ) Notice: Subject to any disclaimer, the term of this patent is extended or adjusted under 35 U.S.C. 154(b) by 592 days.

(21) Appl. No.: 13/087,553

(22) Filed: Apr. 15, 2011

(65) Prior Publication Data

US 2011/0257782 A1 Oct. 20, 2011

(30) Foreign Application Priority Data

Apr. 20, 2010 (CH) .......................................... 561/10

(51) Int. Cl.
*G06F 7/00* (2006.01)
*G05B 19/418* (2006.01)
*B65H 39/10* (2006.01)
*B65H 43/00* (2006.01)
*B65H 39/02* (2006.01)

(52) U.S. Cl.
CPC .... *G05B 19/41865* (2013.01); *B65H 2511/415* (2013.01); *B65H 2557/10* (2013.01); *B65H 39/10* (2013.01); *B65H 2557/25* (2013.01); *B65H 43/00* (2013.01); *G05B 2219/33277* (2013.01); *G05B 2219/32328* (2013.01); *G05B 19/41845* (2013.01); *G05B 2219/33276* (2013.01); *B65H 39/02* (2013.01); *B65H 2301/4318* (2013.01)
USPC .......................................... 700/219; 700/230

(58) Field of Classification Search
USPC ................................................ 700/219, 230
See application file for complete search history.

(56) References Cited

U.S. PATENT DOCUMENTS

| 4,552,349 A | 11/1985 | Loos et al. | |
|---|---|---|---|
| 7,705,742 B1* | 4/2010 | Delaney et al. | 340/676 |
| 7,756,603 B1* | 7/2010 | Delaney et al. | 700/230 |
| 8,443,963 B2* | 5/2013 | Cooper et al. | 198/571 |
| 2004/0186615 A1* | 9/2004 | Wielebski et al. | 700/224 |
| 2005/0108453 A1 | 5/2005 | Maturana et al. | |
| 2005/0192704 A1* | 9/2005 | Wielebski et al. | 700/230 |
| 2009/0292392 A1* | 11/2009 | Cooper et al. | 700/230 |

FOREIGN PATENT DOCUMENTS

| EP | 0491657 A1 | 6/1992 |
|---|---|---|
| EP | 0511159 A1 | 10/1992 |
| EP | 0707253 A1 | 4/1996 |
| EP | 0716037 A1 | 6/1996 |

(Continued)

OTHER PUBLICATIONS

Lathon, RD, et al. "Negotiation Among Scheduling Agents to Achieve Global Production Goals"; Systems, Man and Cybernetics, 1994. Humans, Information and Technology, 1994, IEEE International Conference on San Antonio, TX, USA Oct. 2-5, 1994, NY, NY, USA. ISBN: 978-0/7803-2129-8.

*Primary Examiner* — Ramya Burgess
(74) *Attorney, Agent, or Firm* — Rankin, Hill & Clark LLP

(57) ABSTRACT

A control device controls a processing installation for the production of collections of printed products, wherein the processing installation includes installation sections which combine input streams of part products into output streams of collections of these part products. Control units are assigned to the installation sections and which, on the basis of a predefined product requirement (Pa2, Pa3, Pa4, Pa21, Pa31, Pa41), activate the assigned installation section for the production of a respective output stream. In each case a control unit is set up to obtain product requirements from the master control or from a different control unit, and to produce product requirements for the control unit of an installation section arranged upstream.

14 Claims, 2 Drawing Sheets

(56) References Cited

FOREIGN PATENT DOCUMENTS

| EP | 0918646 | A1 | 6/1999 |
| EP | 1935821 | A1 | 6/2008 |
| WO | 00/19350 | A1 | 4/2000 |

* cited by examiner

CONTROL DEVICE FOR A PROCESSING INSTALLATION FOR THE PRODUCTION OF COLLECTIONS OF PRINTED PRODUCTS

BACKGROUND OF THE INVENTION

1. Field of the Invention

The invention relates to the field of control devices for processing installations of printed products. It relates to a control device for a processing installation for the production of collections of printed products and to a corresponding control method, according to the preamble of the respective independent patent claims.

2. Description of Related Art

Processing installations for printed products comprise feed devices for individual printed products or part products, and units for putting these together into further part products or end products. Typically, the printed products are newspapers, magazines, brochures and likewise. Individual ones of the part products may be produced in a rotation printing machine and be fed directly or via a storage means. Other part products may also be flat supplements such as products samples, CDs. The units are, for example, designed for inserting, collecting or collating, for the putting-together.

Such units, as also further units for labelling, film-wrapping, packing, binding, etc. are combined, set up and programmed into a processing installation in a comprehensive manner according to customer specifications. The programming of a control unit for the complete processing installation must be adapted to the respective configuration. Thereby, the effort for programming the control increases disproportionately with the complexity of installation. The coordination of the individual units by way of the control requires a disproportionate amount of effort and is disproportionately complicated and thus more prone to error.

BRIEF SUMMARY OF THE INVENTION

It is therefore the object of the invention, to provide a control device of the initially mentioned type, and a corresponding control method, which alleviates the disadvantages mentioned above.

This object is achieved by a control device and a control method with the features of the respective independent patent claims.

The control device is set up for the control of a processing installation for the production of collections of printed products; wherein the processing installation comprises at least two installation sections and each of the installation sections is set up to produce an output stream of collections of part products as output products, from several input streams of these part products as input products, and wherein an output stream of at least one first installation section is an input stream of a second installation section arranged downstream of the first one.

Thereby, the control device comprises several programmable control units, wherein it is the case for each of these control units that:

the control unit is assigned to one of the installation sections and controls and monitors this installation section, the control unit, on the basis of a predefined product definition of output products, hereinafter called product requirement, and of a predefined product definition of input products, hereinafter called product specification, is programmed to activate the assigned installation section in a manner such that the output stream of the installation section consists of collections of the part products and corresponds to the product requirement, wherein a first and a second control unit are assigned to the first and the second installation section respectively, the second control unit is set up to receive product requirements from a master control, the second control unit is set up to produce further product requirements for the first control unit and the first control unit is set up to receive these further product requirements from the second control unit.

Preferably thereby, a product definition in each case comprises a specification of a predefined number of individual printed products of the same kind or collections of the same kind, and/or a specification of individual collections.

The first control unit, on account of the further product requirements, activates the first installation section such that the output stream of the first installation section corresponds to these further product requirements. The output stream of the first installation section is an input stream of the second installation section. The second control unit, on the basis of the product requirements, controls the second installation section for putting this output stream together with further part products, whereupon the output stream of the second installation section corresponds to the product requirements. Thus products are produced forwards through the installation, and product requirements are transferred backwards through the control units of the installation. Generally speaking, therefore, in each case a control unit is set up to receive product requirements from a master control or from a control unit is an installation section arranged downstream, and to produce further product requirements for the control unit of an installation section arranged upstream.

Collections, also called compositions, are hereinafter to be understood as any type of combination of printed products into a unit (which may be considered as a part product or as an end product), wherein the printed products which are combined with one another may also again be units from a previous composition. The composing or combining may be effected for example by way of insertion, collection or collation.

The programming is greatly simplified by way of the inventive conceptual and control-technological separation of a complete processing installation into individual sections which communicate with one another essentially via a simple, standardised interface (thus the product requirements). The individual installation sections, as much as possible, operate in an autonomous manner by way of errors being alleviated, inasmuch as is possible, within an installation section. It is only if this is not possible, is a coordination and communication with other installation sections necessary. In a preferred embodiment of the invention, further control units are present for further installation sections, wherein in each case control units which are assigned to an installation section arranged downstream, are set up to produce product requirements and give them to control units of installation sections arranged upstream, and control units which are assigned to an installation section arranged upstream, are set up to receive product requirements from control units of installation sections arranged downstream and to implement these.

The input streams of an installation section are either output streams of one or more installation sections arranged upstream, or come from sources which are assigned to the installation section. Such sources are, for example, storage means such as reels, stacks or continuously producing sources such as e.g. a rotation printing installation. Stacks may be fed by way of feeders, wherein thick products may be fed in by way of several feeders operating in an alternating manner. A product definition of the input products of these input streams, thus the product specification, specified their composition. Elements of the product specification may be given to the control—on the level of the master control or on the level of the individual control units—(e.g. "part product xy is available at feed 123") or, vice versa, may be set by the control (e.g. "part product xy is to be applied at the feed 123").

An output stream of an installation section may, for example, present or demanded on a belt conveyor as an imbricate stream or individualised products, in a gripper chain with products or as a sequence of packages and bags.

In a preferred embodiment of the invention, several installation sections arranged downstream are assigned to a first installation section arranged upstream, and a stream of output products of the first installation section may be split into several input streams of the installation sections arranged downstream. Thereby, the several control units which are assigned to the installation sections arranged downstream, are set up in each case to produce product requirements and give them to the control unit of the first installation section arranged upstream. This first installation section thus produces input streams for the several installation sections arranged downstream. Thereby, these streams may all consist of equally constructed part products, so that the first installation section does not need to make any difference in production. Or these streams may in each case consist of differently constructed part products, so that the first installation section for example sequentially produces one or several part products for a first, then a second, then possibly for yet a third and further installation sections arranged downstream, and then again for the first installation section, etc.

In a preferred embodiment of the invention, a control unit, in the case of a production error which leads to a loss of products in the assigned installation section, is set up to produce a produce requirement and give it to a control unit of an installation section arranged upstream, for the production of replacement products for the lost products. A loss may mean that a product is damaged or is put together in an erroneous manner, and thereby may not be led back or supplemented. The product is ejected in the installation section itself or at a later stage. A product or part product which is seen as being lost may be an individual printed product which has not been correctly put together, or a package, in which one or more contained end products are faulty or are completely missing.

In a preferred embodiment of the invention, if the loss of products in an installation section is detected, and if at this point in time a delivery of the installation section with products of the same kind (with the implementation of a certain product requirement) is still taking place, the control unit is set up to produce a supplementing product requirement and give it to the control unit of the installation section arranged upstream, in order to expand the running delivery with products of the same kind, thus by way of a certain number of additional products of the same type being delivered at the end of the delivery. Thus, in the installation section concerned, one may continue to produce with the already present part products. The parts products, which are thereby additionally used, are provided by way of the extended delivery according to the supplementing product requirement.

In a preferred embodiment of the invention, if the loss of products in an installation section is detected, and a delivery of the installation section with products of the same kind (on implementing a certain product requirement) no longer takes place, the control unit is set up to produce an additional product requirement and give it to the control unit of the installation section arranged upstream, in order to activate an additional delivery with the respective products. In this case for example, the (one or more) lost product is produced separately and delivered at a later stage. Here, as also very generally, no lost product may be a part product or an end product from printed products (collection), or a stack or a package of end products.

A control unit may be designed in each case on its own control hardware unit. However, also two or more or all control units may be designed on the same hardware unit.

In a preferred embodiment of the invention, the several control units are instances of the same generic control unit. Thereby, preferably a generic control unit is formed by a generic control software unit. Thus, it is possible to apply essentially the same generic software for different installation sections which cooperate with one another. The programming effort and the configuration work for the complete installation are significantly reduced by way of this.

One instance of a generic control unit is thereby preferably created:
  by way of duplicating a generic control software unit and/or
  by way of programming a generic control hardware unit with a generic control software unit,
amid the configuration and parameter assignment according to the respective installation section controlled by this instance.

A data processing system as part of a control unit or of the control device comprises memory means with computer program code means which are stored therein and which describe a computer program, and data processing means for carrying out the computer program, wherein the implementation of the computer program leads to the implementation of the method according to the invention.

The computer program for realising the method according to the invention may be loaded into an internal memory of a digital data processing unit and comprises computer program code means which, when they are carried out in a digital data processing unit, bring this to carry out the method according to the invention. In a preferred embodiment of the invention, a computer program product comprises a data carrier or a computer-readable medium, on which the computer program code means are stored.

Further preferred embodiments are to be deduced from the dependent patent claims. Thereby, the features of the method claims with regard to context a may be combined with the device claims and vice versa.

BRIEF DESCRIPTION OF THE DRAWINGS

The subject matter of the invention is hereinafter explained in more detail by way of preferred embodiment examples which are represented in the accompanying drawings. In each case are schematically shown in.

The reference numerals used in the drawings and their significance are listed in a conclusive manner in the list of reference numerals. Basically, the parts, which are the same in the figures, are provided with the same reference numerals.

DETAILED DESCRIPTION OF THE INVENTION

Figure 1:
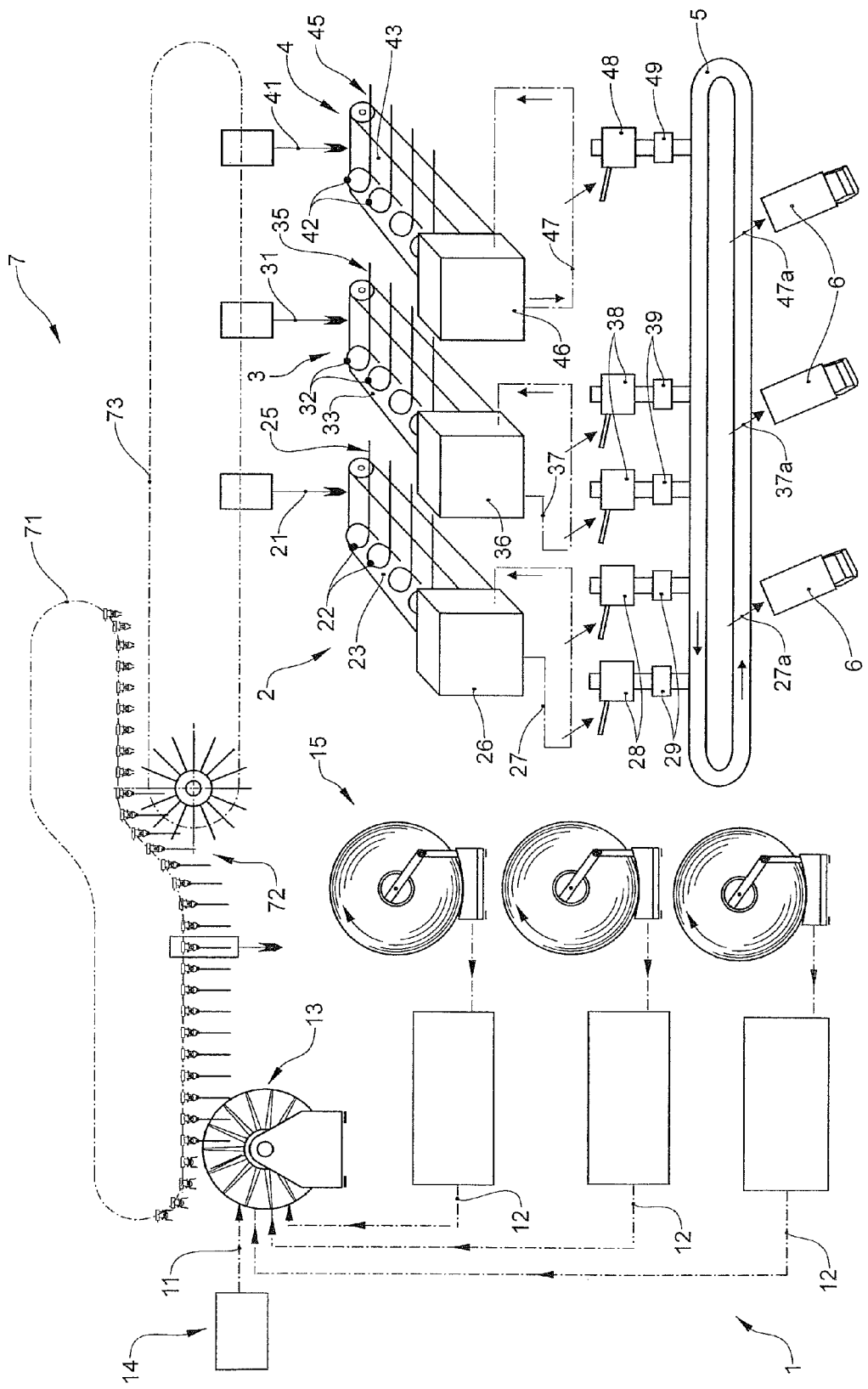
FIG. 1 a construction of a processing installation.

FIG. 1 shows a set up of a processing installation: This may be subdivided in a coarse manner into a first installation section 1, which via an intermediate unit 7, supplies several, in this case three, further installation sections 2, 3, 4 with part products or streams 21, 31, 41 of part products. The first installation section 1 comprises an insert drum 13 which is supplied by a rotation printing installation 14, with a main product stream or a first input stream 11 and further product streams or further input streams 12 from reels 15. The part products which are combined into a further part product are removed from the drum 13 and are transported in an intermediate unit 7 via a first circulation 71 and a transfer unit 72, onto a second circulation 73. The part products are released from the second circulation 73 in a selectively controlled manner onto one of the three further installation sections 2, 3, 4.

These further three installation sections 2, 3, 4 on the one hand are fed from the intermediate unit 7 in each case with a second, third and fourth input stream 21, 31, 41. On the other hand, these installation sections are fed in each case with second, third and fourth further input streams 22, 32, 42. These are fed in each case by way of several first, second, third feed conveyors 23, 33, 43 per installation section. Here, in each case a device for collating 23, 33, 43 is present for putting together respective output product of one of the further installation sections 2, 3, 4. In each case, a film-wrapping unit 26, 36, 46 is arranged at the end of these collation devices and this unit delivers a stream of optionally film-wrapped starting products 27, 37, 47 to an output circulation. This circulation per installation section 2, 3, 4, in each case feeds one or several stacking units 28, 38, 49 with binding units 29, 39, 49 which are arranged downstream. Bound stacks are conveyed in a distributed manner via a plate chain transporter 5, in the form of output package streams 271, 371, 471, into lorries.

On operation of the complete installation, the intermediate unit 7 may deliver all three or only one or two of the further installation sections 2, 3, 4. The part products which are delivered to the further installation sections 2, 3, 4, may be of the same kind, or the first installation section 1 may produce groups of in each case two or three different part products which are conveyed after one another, for two or three delivered further installation sections. The part products and products may basically be conveyed and processed in an individualised manner, i.e. that the composition of each (part) product may be known and controlled individually.

Figure 2:
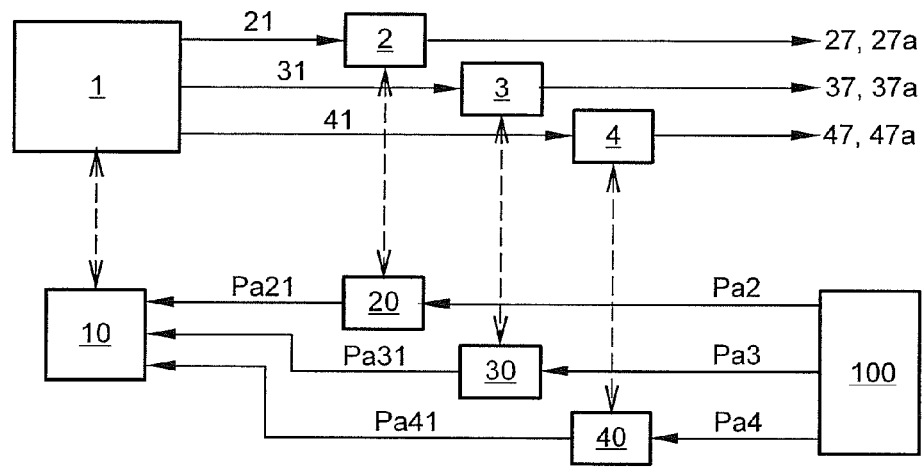
FIG. 2 a schematic structure of this processing installation with corresponding control units.

Instead of a monolithic control which centrally coordinates and monitors all procedures, several control units 10, 20, 30 are present, as is represented in FIG. 2. This shows a greatly schematic structure of the processing installation of FIG. 1 with corresponding control units. The installation sections 1, 2, 3, 4 are represented in the upper half of the figure and the control units 10, 20, 30, 40 which are assigned in each case to an installation section and which are connected to the respective installation sections via measurement and control connections drawn in a dashed manner, are represented in the lower half. A master control 100 transfers product requirements Pa2, Pa3, Pa4 to the further installation sections 2, 3, 4. These product requirements Pa2, Pa3, Pa4 may, for example, be formulated as a requirement placed upon the stream of output products 27, 37, 47 or of output packages 27a, 37a, 47a.

The further installation sections 2, 3, 4 form the conveyed output products or output packages from the part products from their respective feed conveyors 25, 35, 45 and from the respective further input stream 21, 31, 41. For this, they or the respective control unit 10, 20, 30, on account of further product requirements Pa21, Pa31, Pa41, demand or demands accordingly necessary part products or part product streams from the first installation section 1. The information flow or the control flow, seen on this level of the installation sections, thus runs backwards through the installation, starting from the conveyed end products.

The forwards running flow of part products as an input stream 21, 31, 41 into the further installation sections 2, 3 4 is represented by arrows, just as the stream of output products 27, 37, 47 or of output packages 27a, 37a, 47a.

A product requirement is a formalised description of the composition of a sequence of printed products. Thereby, in principle, each individual printed product may be defined in an individualised manner. The implementation of product requirements for the control of a production installation is basically known, often under the term post press management.

As to how in the present case, the formalised description is structured, is basically of secondary importance. For example (part) products may be described individually, e.g. a sequence of products as:

product k: main product A, supplements B, C, D, address label with text abc . . .

product k+1: main product A, supplements B, C, address label with the text def . . .

product k+2: main product A, supplements B, D, address label with text ghi . . .

product k+3: main product F, supplements B, C, D, address label with text jkl . . .

A sequence of products of the same kind may be described by the number of products and their composition, for example 600 exemplars comprising in each case the main product A, supplements B, C, D Further information which may be combined with such a description of a sequence or of an individual product is e.g.

the format of the product or of its parts;

control information on whether the production is to be monitored or not monitored;

how one should proceed in the case of errors in the product composition (ignoring, rejection, post-ordering, correcting . . . );

data for package inserts, barcodes or RFID-tags, which are assigned to individual products or packages;

information as to whether the contents are in order or not (collections which are not correct are e.g. rejected at a later stage);

additional information, e.g. an order number.

Different product demands may be used at the different interfaces of the installation sections. For example in the structure according to FIG. 1 the product requirements Pa2, Pa3, Pa4 are described by: name of a (district) zone to be delivered with printed products; number and set-up of individual packages for this zone; construction of the products in these packages and further information as described above. Several zones may be described in a grouped manner as a distribution route of a lorry.

the further product requirements Pa21, Pa31, Pa41 described by: number of products; composition of the products in these packages and further information as already described above.

Figure 3:
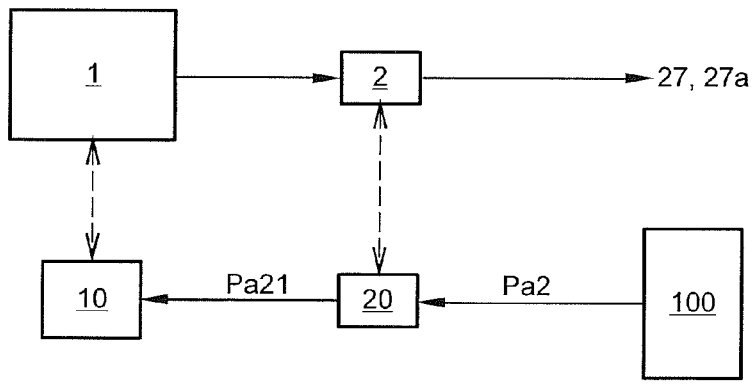
FIGS. 3 and 4 further structures of processing installations with control units.
Figure 4:
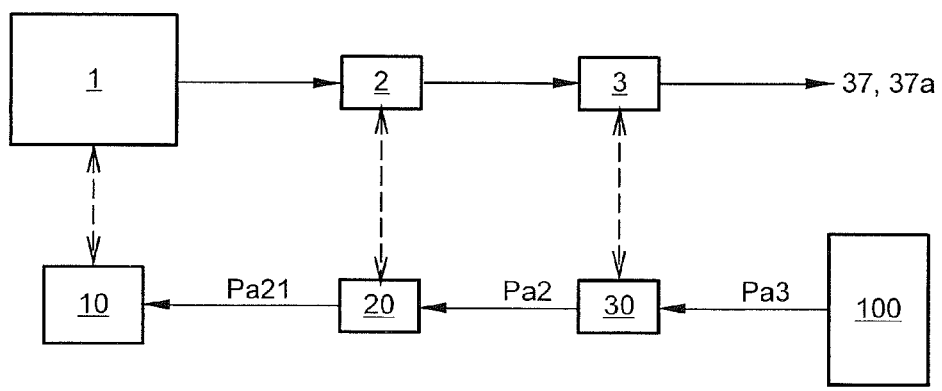

FIGS. 3 and 4 show further exemplary structures of processing installations with control units. In FIG. 3, two, and in FIG. 4 three installation sections 1, 2, 3 are connected one after the other. Respective control units 10, 20, 30 give their product requirements, proceeding from the product requirements of the master control 100, in each case opposite the production direction, backwards to the control units of the preceding installation sections. Such sequences of installation sections according to FIGS. 3 and 4 and splitting-up of product streams according to FIG. 2, as well as products streams which unify in an installation section (not represented), may in principle be combined with one another in an infinite manner and be controlled by way of control devices which are structured according to the invention and which communicated with one another.

The invention claimed is:

1. A control device for a processing installation for the production of collections of printed products, wherein the processing installation includes at least two installation sections and each of the installation sections is set up to produce an output stream of collections of part products as output products, from several input streams of these part products as input products, and wherein an output stream of at least one first installation section is an input stream of a second installation section arranged downstream of the first installation section, wherein the control device comprises:
   several programmable control units, wherein:
      each control unit is assigned to an associated one of said first and second installation sections and controls and monitors said associated installation section, and
      each control unit, on the basis of a predefined production definition of output products, hereinafter called product requirement, and of a predefined product definition of input products, called product specification, is configured to activate the associated installation section such that the output stream of the associated installation section consists of collections of the part products and corresponds to the product requirement,
   wherein first and second control units are assigned to the first and second installation sections, respectively,
   wherein the second control unit is set up to receive product requirements from a master control or from another control unit,
   wherein the second control unit is set up to produce further product requirements for the first control unit, and
   wherein the first control unit is set up to receive these further product requirements from the second control unit.

2. The control device according to claim 1, wherein a product definition in each case has a specification of a predefined number of individual printed products of the same kind or collections of the same kind, and/or a specification of individual collections.

3. The control device according to claim 1, wherein further control units are present for further installation sections, and in each case
   control units that are assigned to downstream installation sections, are set up to produce product requirements and give them to control units of installation sections arranged upstream, and
   control units that are assigned to upstream installation sections, are set up to receive and implement product requirements from control units of installation sections arranged downstream.

4. The control device according to claim 1, wherein several installation sections arranged downstream are assigned to the first installation section arranged upstream, a stream of output products of the first installation section is split into several input streams of the installation sections arranged downstream, and the several control units that are assigned to the installation sections arranged downstream, are in each case set up to produce product requirements and give them to the control unit of the first installation section arranged upstream.

5. The control device according to claim 1, wherein at least one control unit, in the case of a production error resulting in a loss of products of one kind in the assigned installation section, is configured to produce a product requirement and give it to a control unit of an installation section arranged upstream, for the production of replacement products to replace the lost products.

6. The control device according to claim 5, wherein, if the loss of products of the one kind in the installation section is detected, and a delivery of the installation section with products of the one kind still takes place, the at least one control unit is set up to produce a supplementing product requirement and give the supplementing product requirement to the control unit of the installation section arranged upstream, in order to expand the running delivery with products of the one kind.

7. The control device according to claim 5, wherein, if the loss of products in the installation section is detected, and at this point in time a delivery of the installation section with products of the one kind no longer takes place, the at least one control unit is set up to produce an additional product requirement and give it to the control unit of the installation section arranged upstream, in order to activate an additional delivery with the one kind of products.

8. The control device according to claim 5, wherein a lost product is a part product or an end product of printed products or a stack or a package of end products.

9. The control device according to claim 1, wherein several control units are instances of a same generic control unit and wherein a generic control unit is formed by a generic control software unit.

10. The control device according to claim 9, wherein an instance of a generic control unit is created by way of duplicating a generic control software unit and/or is created by way of programming a generic control hardware unit with a generic control software unit, amid the configuration and parameter assignment according to the respective installation section controlled by said instance.

11. A method for controlling a processing installation for producing collections of printed products, wherein the processing installation includes at least two installation sections, and each of the installation sections is set up to produce an output stream of collections of part products, as output products, from several input streams of the part products as input products, and wherein an output stream of at least one first installation section is an input stream of a second installation section arranged downstream of the first one, comprising the steps of:
   providing a control device that comprises several programmable control units, wherein:
      each control unit is assigned to an associated one of the installation sections and controls and monitors the associated installation section,
      each control unit, on the basis of a predefined production definition of output products, hereinafter called product requirement, and of a predefined product definition of input products, called product specification, is configured to activate the associated installation section such that the output stream of the associated installation section corresponds to the product requirement,
         wherein a product definition in each case comprises a specification of a predefined number of individual printed products of a same kind or collections of the same kind, and/or a specification of individual collections, and
   assigning a first and a second control unit to the first and the second installation section respectively,
   the second control unit receives product requirements from a master control or from another control unit and controls the second installation section for the production of part products according to these product requirements, the second control unit produces further product requirements for the first control unit, and the first control unit receives these further product requirements from the second control unit and controls the first installation section for the production of part products according to the further product requirements.

12. A computer-readable medium with a computer program stored thereon that may be loaded and implemented on a data processing unit of a control device according to claim 1.

13. A processing installation for the production of collections of printed products, wherein the processing installation comprises at least two installation sections, and each of the installation sections is set up to produce an output stream of collections of part products as output products from several input streams of these part products as input products, and wherein an output stream at least of a first installation section is an input stream of a second installation section which is arranged downstream of the first installation section, comprising a control device according to claim 1.

14. A computer-readable medium with a computer program stored thereon that may be loaded and implemented on a data processing unit of a control device which, on its execution, carries out the method according to claim 10.

* * * * *